United States Patent
Breitman

(10) Patent No.: US 11,388,367 B2
(45) Date of Patent: Jul. 12, 2022

(54) METHODS AND APPARATUS FOR AUTOMATIC MEDIA FILE TRANSCODING

(71) Applicant: EMC IP Holding Company LLC, Hopkinton, MA (US)

(72) Inventor: Karin Breitman, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/912,892

(22) Filed: Jun. 26, 2020

(65) Prior Publication Data
US 2020/0329212 A1 Oct. 15, 2020

Related U.S. Application Data

(63) Continuation of application No. 15/079,635, filed on Mar. 24, 2016, now Pat. No. 10,757,360.

(51) Int. Cl.
H04N 7/01 (2006.01)
H04N 19/40 (2014.01)

(52) U.S. Cl.
CPC ............ *H04N 7/01* (2013.01); *H04N 19/40* (2014.11)

(58) Field of Classification Search
CPC .................................. H04N 7/01; H04N 19/40
See application file for complete search history.

(56) References Cited

U.S. PATENT DOCUMENTS

| | | | |
|---|---|---|---|
| 8,200,810 B2 | 6/2012 | Gagliardi et al. | |
| 2002/0087797 A1 | 7/2002 | Adrangi | |
| 2003/0158913 A1 | 8/2003 | Agnoli et al. | |
| 2005/0083910 A1 | 4/2005 | Hallin et al. | |
| 2008/0231480 A1 | 9/2008 | Lai et al. | |
| 2013/0054837 A1 | 2/2013 | von Elgg et al. | |
| 2013/0074109 A1 | 3/2013 | Skelton et al. | |
| 2013/0083848 A1 | 4/2013 | Joch et al. | |
| 2014/0033242 A1 | 1/2014 | Rao et al. | |
| 2015/0074152 A1* | 3/2015 | Boic | G06F 16/48 707/803 |

OTHER PUBLICATIONS http://developer.android.com/guide/appendix/media-formats.html—Android Developer documentation—accessed on Oct. 25, 2015.

(Continued)

*Primary Examiner* — Apu M Mofiz
*Assistant Examiner* — Husam Turki Samara
(74) *Attorney, Agent, or Firm* — Ryan, Mason & Lewis, LLP

(57) ABSTRACT

Methods and apparatus are provided for automatically transcoding media files. An exemplary method comprises obtaining an input media file having an input file format and encoded with a codec of a first type; automatically determining output media file formats for transcoding the input media file based on statistics of previously transcoded files and statistics of trending media formats for previously downloaded files; transcoding the input media file into transcoded output media files using a codec of a second type to obtain the determined output media file formats; and generating metadata for each of said plurality of transcoded output media files, wherein said metadata is stored in memory as a media catalogue separately from said one or more transcoded output media files.

20 Claims, 10 Drawing Sheets

(56) References Cited

OTHER PUBLICATIONS

Realplayer 8 Plus User Manual, Real Networks, Inc., Revision 1.0, 2000.
https://support.microsoft.com/en-us/kb/316992—File types supported by Windows Media Player—accessed on Oct. 25, 2015.
http://www.adobe.com/products/flashplayer/tech-specs.html—Adobe Flash Player—technical specification—accessed on Oct. 25, 2015.
httpL:/www.w3.org/TR/html5/—HTML5—A vocabulary and associated APIs for HTML and XHTML—W3C Recommendation Oct. 28, 2014—accessed on Oct. 25, 2015.
http://www.iso.org/iso/iso_catalogue/catalogue_tc/catalogue_detail.htm?csnumber=34228—ISO/IEC 15938-1:2002—Information technology—Multimedia content description interface—Part 1: Systems—accessed on Oct. 25, 2015.
Benitez et al., "Semantics of multimedia in MPEG-7," in Image Processing. 2002. Proceedings. 2002 International Conference in vol. 1, No., pp. I-137-I-140 vol. 1, 2002.

* cited by examiner

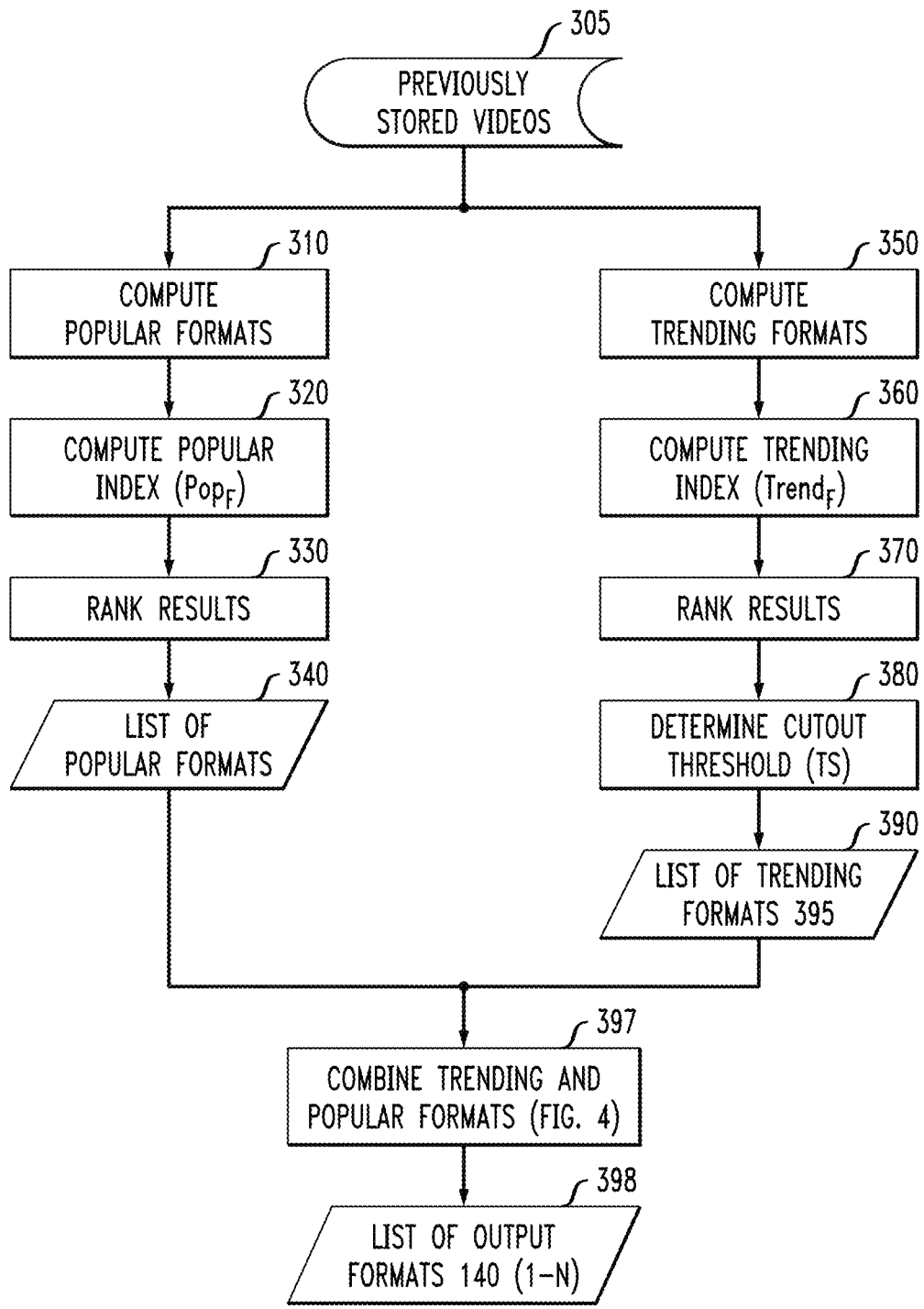

FIG. 4

```
┌─ 400
│ 1. DEFINE WEIGHTS FOR POPULAR (Wp) AND TRENDING (Wt) FORMATS
│    (NUMBER RANGING FROM 0-1), SUCH THAT ZERO REPRESENTS NO
│    PARTICIPATION AND 1 REPRESENTS TOTAL PARTICIPATION, SUCH THAT
│    THE SUM OF Wp TO Wt IS EQUAL TO 1.
│
│ 2. APPLY THE WEIGHTS AS PERCENT CUT TO THEIR RESPECTIVE LISTS,
│    e.g., A WEIGHT OF 0.2 REPRESENTS THE TOP 20% OF A LIST, A
│    WEIGHT OF .9 REPRESENTS THE TOP 90% OF THE LIST OF SELECTED
│    FORMATS.
│
│ 3. COMBINE THE REMAINING ITEMS OF BOTH LISTS (e.g., TRENDING AND
│    POPULAR FORMATS) TO FORM THE COMBINED LIST.
```

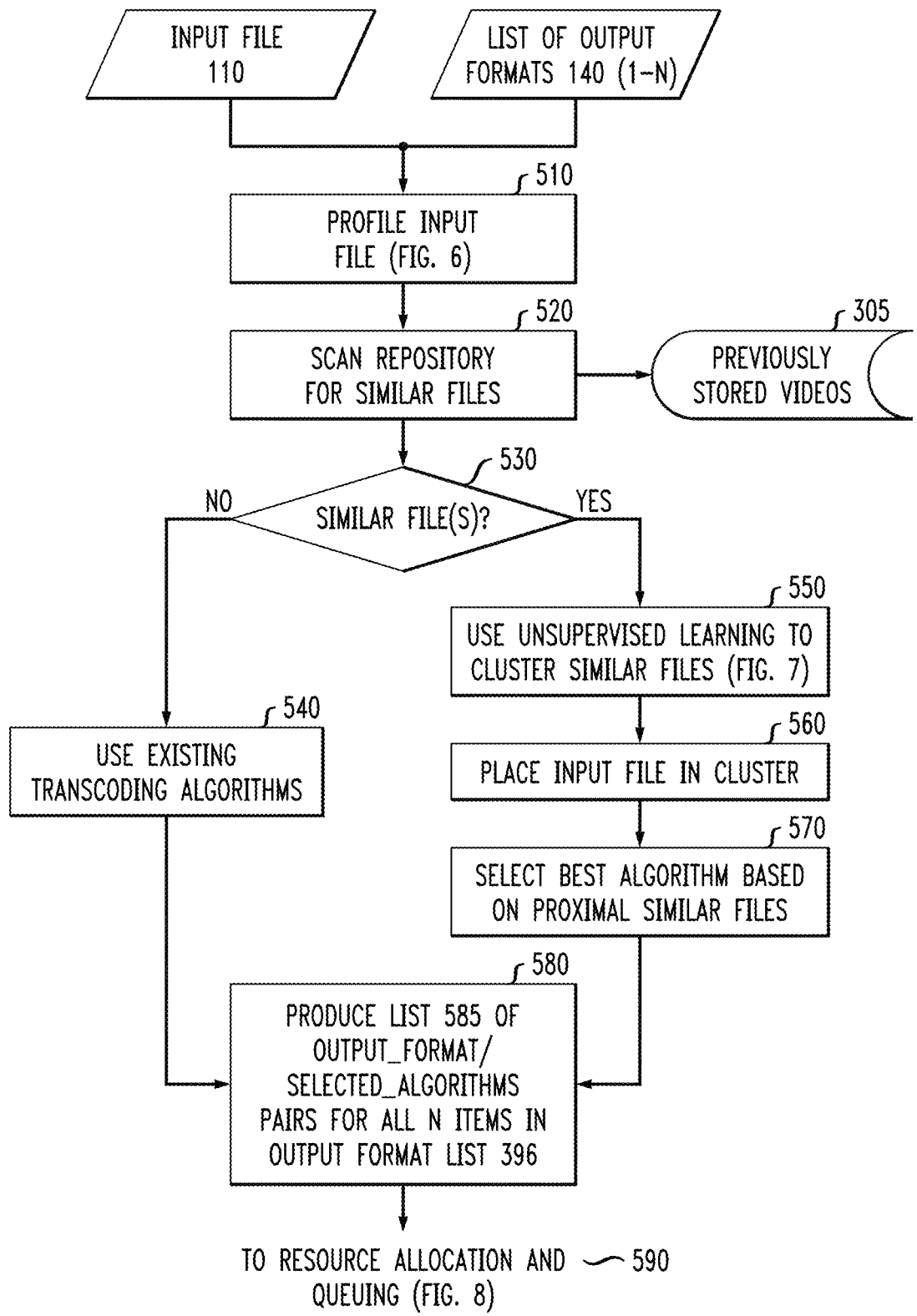

FIG. 6

```
COLLECT THE FOLLOWING DATA ABOUT INPUT FILE HEADER AND METADATA
(WHEN AVAILABLE):
- TIME STAMP
- DATE OF CREATION
- FORMAT
- CODEC
- LOCATION
- CONTENT METADATA

CONTENT METADATA EXAMPLE 650:

;FFMETADATA1
composer=Willie Royal
title=Napali
artist=Willie & Lobo
album=Caliente
genre-Jass track=2/11
date=1997
album_artisit=Willie & Lobo
transcoded=yes
Previous_format= .WAV
Encoder= Ogg Vorbis
Encoding_time= 0.02s
```

FIG. 7

1. DEFINE NUMBER OF CLUSTERS n (n ε N)
2. CHOOSE A CENTROID BASED CLUSTERING ALGORITHM (K-means, K-medoids, FUZZY c-means, etc..)
3. COMPUTE CLUSTERS
4. PLACE INPUT FILE IN CLUSTER
5. SELECT BEST TRANSCODING ALGORITHM BY EVALUATING THE ONES USED BY 3 CLOSEST FILES TO THE INPUT FILE IN THE CLUSTER. IF THERE'S NO OBVIOUS RESULT, INCREASE ANALYSIS TO 5, 7 AND SO ON. USE SIMPLE MAJORITY AS A CRITERIA TO SELECT BEST ALGORITHM.

MANUAL OR AUTOMATIC SELECTION INTERFACE EXAMPLE

MANUAL SET UP INTERFACE EXAMPLE

AUTOMATIC SELECTION INTERFACE EXAMPLE

METHODS AND APPARATUS FOR AUTOMATIC MEDIA FILE TRANSCODING

FIELD

The field relates generally to techniques for transcoding media files from an input format to one or more output formats.

BACKGROUND

In the field of video production and distribution, the volume of information to be processed is increasing at an outstanding pace. The ever increasing popularity of videos on the Internet, allied to the recent advances in networking, are drastically changing video consumption habits. In parallel, the proliferation of electronic devices, such as smart phones, watches, tablet, desktops and laptop computers, being used to consume video content from the Internet is increasing at exponential rates.

Features and support often vary greatly from device to device, such as image ratios, maximum resolution, and supported encoders, decoders, and file types. In addition, the variations in bandwidth availability often require that the same content is provided with multiple resolutions.

Thus, content distributers are faced with the challenge of transforming and distributing media in several different formats. The Android® operating system, for example, supports H.263, H.264 AVC, H.265, MPEG-4 SP (Moving Picture Experts Group), VP8 and VP9 video formats (among others). In addition, the H.264 codec, for example, offers two versions of standard definition video resolution, as well as a high definition video resolution, each having associated frame rates, bitrates, audio codecs, audio channels and audio bitrates.

A need therefore exists for methods and apparatus for automatically transcoding media files.

SUMMARY

Illustrative embodiments of the present invention provide methods and apparatus for automatically transcoding media files. In one exemplary embodiment, a method comprises obtaining at least one input media file having an input file format and encoded with a codec of a first type; automatically determining one or more output media file formats for transcoding the one or more input media files based on statistics of previously transcoded files and statistics of one or more trending media formats for previously downloaded files over a given period of time; and transcoding the one or more input media files into one or more transcoded output media files using a codec of a second type to obtain the determined one or more output media file formats, wherein at least one of the output media file formats is a different file format than the input file format. The method may include generating metadata for each of said plurality of transcoded output media files, wherein said metadata is stored in memory as a media catalogue separately from said one or more transcoded output media files. The metadata may include historical information for a given one of the plurality of transcoded output media files. The said historical information for said given transcoded output media file may include one or more of: a previous format; a type of encoder used for said transcoding; an encoding time; an indication of whether said transcoding applied parallelization; and a number of cores used in said parallelization. The separate media catalogue may be accessible via a content delivery network and the plurality of transcoded output media files may be accessible via a network file system. The statistics of previously transcoded files comprise, for example, a popularity measure of each media format used to transcode the previously transcoded files.

In one or more embodiments, the output media file formats for transcoding the one or more input media files are automatically determined by (i) assigning a weight to a set of popular media file formats selected based on the popularity measure and a weight to a set of the trending media file formats; and (ii) combining the weighted media file formats into a single list.

In at least one embodiment, transcoding algorithms for transcoding the input media files into the determined output media file formats are automatically selected using an unsupervised technique for grouping similar objects that identifies an algorithm used to transcode one or more proximally similar files as the one or more input media files from the previously transcoded files. In one exemplary embodiment, the input files to transcode are dynamically prioritized based on a complexity rating of the determined one or more output media file formats and a ranking of the selected transcoding algorithms.

Advantageously, illustrative embodiments of the invention provide improved techniques for automatically transcoding media files. These and other features and advantages of the present invention will become more readily apparent from the accompanying drawings and the following detailed description.

BRIEF DESCRIPTION OF THE DRAWINGS

FIG. 3 is a flow chart illustrating an exemplary implementation of the automatic output format selection process, according to one embodiment of the invention;

FIG. 4 illustrates exemplary pseudo code for combining the trending and popular formats identified by the exemplary automatic output format selection process of FIG. 3;

FIG. 5 is a flow chart illustrating an exemplary implementation of the transcoding algorithm(s) selection process, according to one embodiment of the invention;

FIG. 6 illustrates the collection of profile information for the exemplary input file of FIG. 1;

FIG. 7 illustrates exemplary pseudo code for clustering similar files by the transcoding algorithm(s) selection process of FIG. 5;

DETAILED DESCRIPTION

Figure 1:
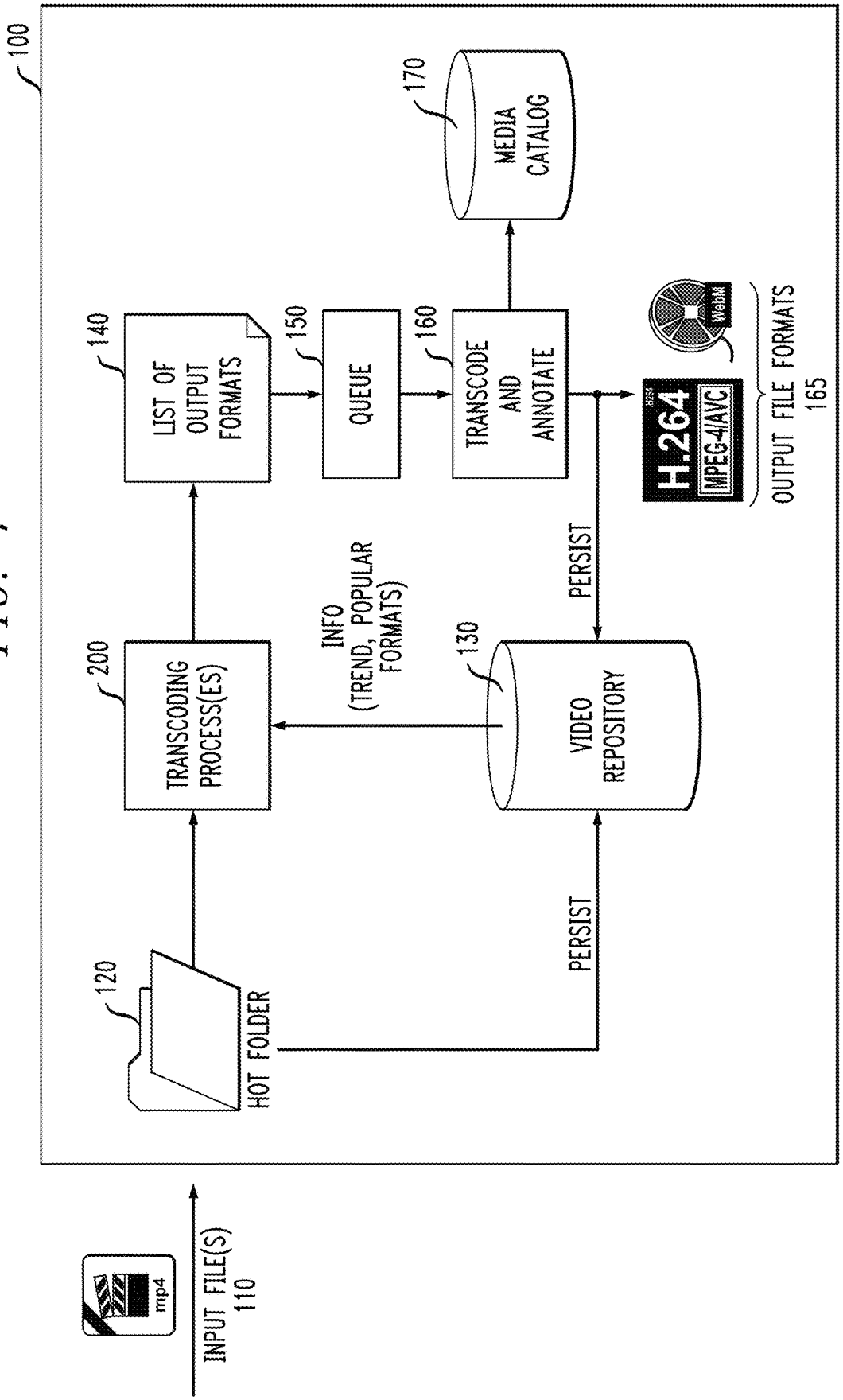
FIG. 1 illustrates an exemplary automatic media transcoding system, according to one embodiment of the invention.

Illustrative embodiments of the present invention will be described herein with reference to exemplary communication, storage, and processing devices. It is to be appreciated, however, that the invention is not restricted to use with the particular illustrative configurations shown Aspects of the present invention provide methods and apparatus for automatically transcoding an input media file into a plurality of output media file formats for distribution to various devices. Various optional aspects of the invention (1) identify and create a dynamic list of relevant (e.g., popular and/or trending) output formats; (2) profile and identify efficient transcoding algorithms for a given input media file; (3) manage and allocate compute resources; (4) manage a job queue; (5) annotate output files to facilitate search and recovery; and (6) automatically create a media catalogue.

As used herein, "transcoding" means to convert a media file from one form of coded representation to another form of coded representation, such as for video data files (e.g., PAL (Phase Alternating Line), SECAM (Sequential Color with Memory) and NTSC (National Television System Committee) video formats), audio files (e.g., MP3 (MPEG-2 Audio Layer III), WAV (Waveform Audio File Format) audio formats), or character encoding (e.g., UTF-8 (defined by Unicode), ISO/IEC 8859 (International Organization for Standardization/International Electrotechnical Commission 8-bit character encoding format)).

In one or more embodiments, the media transcoding techniques disclosed herein employ one to many (1:N) transcoding of media files. Thus, one original media file is received and is transcoded into a plurality of output formats. The selection of the desired N output formats can be done (1) manually (e.g., with the aid of a user interface that allows users to manually select the desired output formats); or (2) automatically to propose a ranked list of suggested formats (e.g., with the aid of an algorithm that crawls the storage system to identify existing formats, trends in the transcoding process, popularity (of downloaded files), and potentially also consults external sources).

One aspect of the invention observes trends in the popularity of chosen formats. As media technology (and video technology, in particular) is constantly evolving, it is common that the market swings its preferred platform choice from time to time. In the recent past, for example, popularity has moved from RealNetworks™ technology (e.g., RealVideo™ format and RealMedia™ format), to Microsoft Windows Media™ formats, followed by Adobe's Flash™ technology, with a future that points to a possible adoption of the HTML 5 standard.

Of course, each of these technologies defines a set of associated formats, codecs and transport protocols. Switching video platforms will likely require transcoding contents to new formats, codecs, as well as server migration. It is, therefore, very important to be aware of market preferences, so as to quickly adapt to changes, and focus on the most relevant (preferred) formats.

Once a list of output formats is obtained, one or more embodiments of the invention profiles the media file to be transcoded. As it relates to existing (typically, open source) algorithms for file transcoding, there is a tremendous list to choose from. It has been found that the success of the transcoding process, measured in both the efficiency of the process, as well as the quality of the final product, is often related to the choice of transcoding algorithm(s) made. A media file profiling technique is employed that identifies contextual information about the input file, and correlates the contextual information to similar files stored in the file system (and the processes used in transcoding them), to gather intelligence around choices made with respect to files, algorithms used in the transcoding process and their final outcomes. In one or more embodiments, results are "learned" (e.g., incorporated using machine learning techniques) and used to refine future uses of the media file profiling algorithm).

The output formats and the particular transcoding algorithm(s) to be used in the transcoding process are determined before the transcoding begins. Efficient media transcoding is computationally expensive, and can be done in parallel. The resource allocator balances between the effort required to process the file and overall load of the transcoding system to determine the resources allotted to processing of a new media file.

A resource allocator component, as discussed further below in conjunction with FIG. 8, takes into consideration the attributes of the media file in question (e.g., size and encoding) and contextual data (as per the particulars of its submission and additional information obtained from its metadata, including provenance data and information about the file itself such as creation date) and estimates the necessary effort to process the input file into all the desired formats, as informed by the resource allocator. This process may be aided by the use of predictive techniques, based on the original file media format, the size (e.g., duration of the video content) of the file, and the original encoding used.

The nature of the media transcoding process typically demands that each file is transcoded into several different formats, some more relevant than others. In the presence of different input files to process, a queue, as discussed further below in conjunction with FIGS. 1, 2 and 8, organizes the jobs in such way that the most relevant (popular) formats are processed first, even if it means postponing the processing of transcoding an older file (to a less used format) in favor of a newly arrived file (to a very popular format).

Transcoding is often a very time sensitive process, for the ability to make some content (e.g., breaking news) readily available to consumers gives a significant competitive edge for media distributers. Thus, in one or more embodiments, the resource allocation process is highly dynamic, and re-evaluated at constant intervals.

Figure 2:
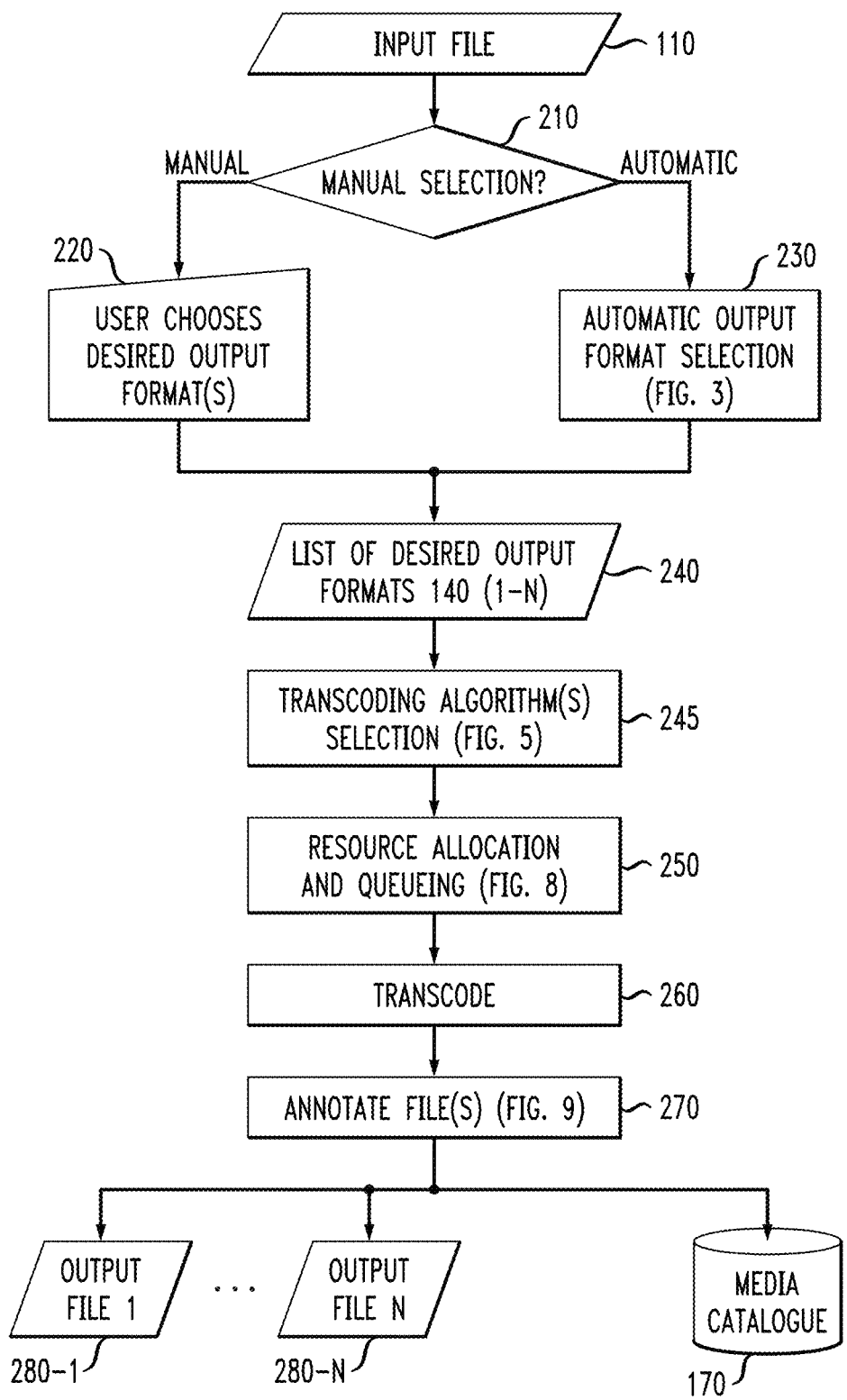
FIG. 2 is a flow chart illustrating an exemplary implementation of an automatic media transcoding process, according to one embodiment of the invention.
Figure 9:
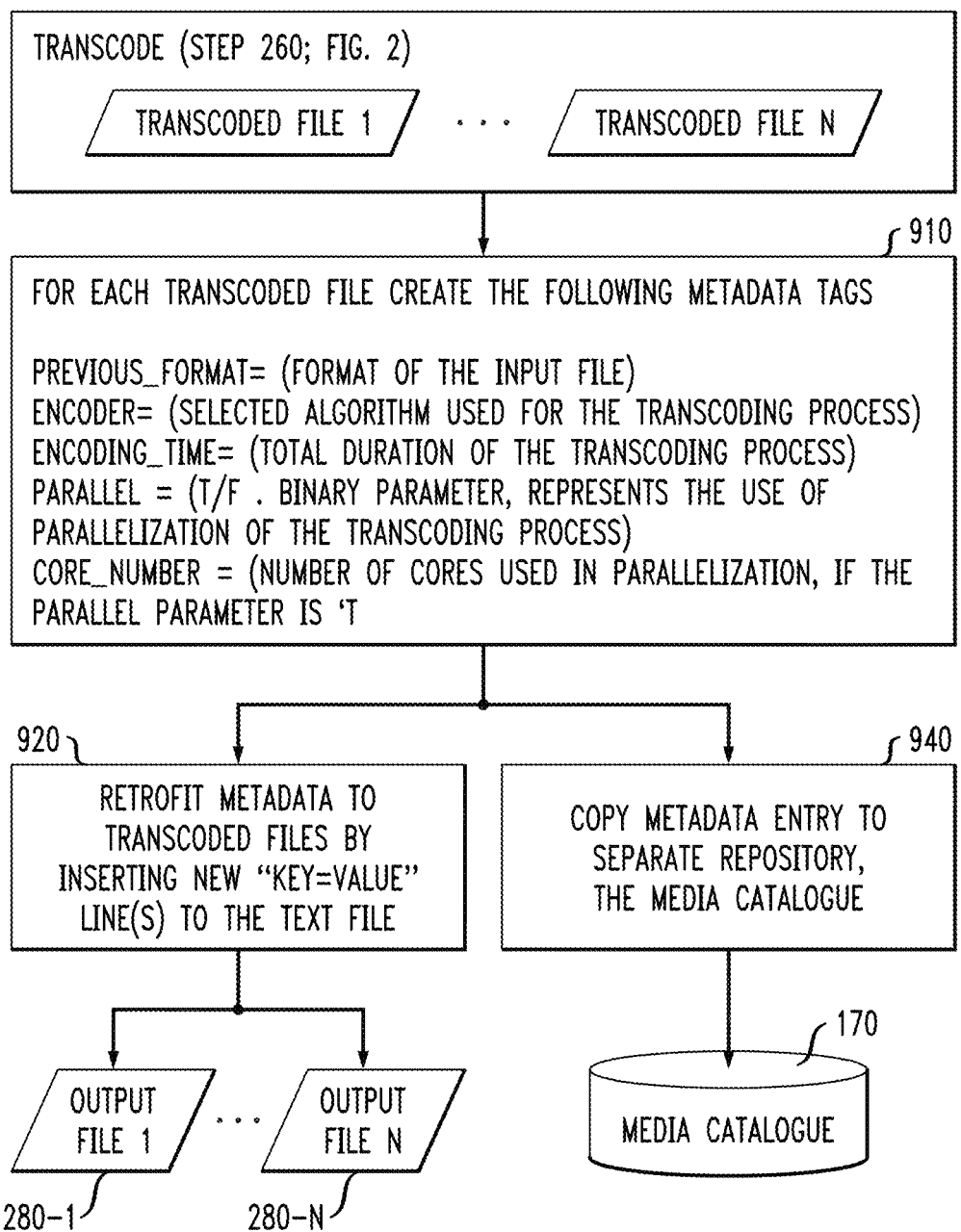
FIG. 9 is a flow chart illustrating an exemplary implementation of a metadata annotation process, according to one embodiment of the invention.

Once the transcoding has occurred, the exemplary media transcoding process 200, as discussed further below in conjunction with FIGS. 2 and 9, provides additional information regarding these newly created files. Media files typically provide information about the file system in which they reside, including directory names and paths, and usually some system information, e.g., creation date and time stamp. One or more embodiments of the invention enrich the metadata by suggesting the use of standard schemas, such as the Multimedia Content Description Interface Standard (MPEG-7-ISO/IEC 15938), at the same time allowing for user input by providing additional "free style" fields for comment and annotations. Suggestions are made using a machine learning approach to an entity suggestion (e.g., those in MPEG-7 and other standards), based on the profiling of the media file made in an earlier stage of this process 200.

The annotated metadata is then optionally stored in a separate repository, typically much smaller in size than the file system that contains the actual media files. Thus, one aspect of the invention optionally separates media files and metadata (e.g., in a catalogue with enriched metadata and pre-computed indices) to allow for differentiated architectures (the smaller catalogue can be stored in memory, thereby improving search performance) and the catalogue can optionally be made available as a content delivery network (CDN), to support multiple, geographically distributed, concurrent accesses to the catalogue. The actual media files can be stored separately and made accessible through a Network File System (NFS). The benefits are that media files and metadata can each be stored and indexed in an optimal way.

FIG. 1 illustrates an exemplary automatic media transcoding system 100, according to one embodiment of the invention. As shown in FIG. 1, the exemplary automatic media transcoding system 100 receives one or more input files 110 to be transcoded. A hot folder 120 serves as a file system directory that is monitored to detect the input file 110. The hot folder 120 automatically provides the input file 110 to one or more transcoding processes 200, discussed further below in conjunction with FIG. 2, and stores a copy of the input file 110 in a video repository 130.

As discussed further below in conjunction with FIG. 2, the transcoding processes 200 generate a list of output formats 140 that the input file 110 should be transcoded into. The job is stored in a queue 150 that performs dynamic resource management. The input file is eventually transcoded into the output formats 165 designated in the list 140. The transcoded output files are annotated with metadata at stage 160, as discussed further below in conjunction with FIG. 9. The transcoded output files are persisted into the video repository 130. The enriched metadata is optionally stored separately in a media catalog 170.

FIG. 2 is a flow chart illustrating an exemplary implementation of an automatic media transcoding process 200, according to one embodiment of the invention. As shown in FIG. 2, the exemplary automatic media transcoding process 200 receives the input file 110 as input.

A test is performed during step 210 to determine if the user has selected an automatic or manual selection of the desired output formats (for example, using an interface 1000, discussed further below in conjunction with FIG. 10). If it is determined during step 210 that the user has selected a manual selection, then the user chooses the desired output format(s) during step 220 (for example, using an interface 1100, discussed further below in conjunction with FIG. 11). If, however, it is determined during step 210 that the user has selected an automatic manual selection, then an automatic output format selection is made during step 230, using an automatic output format selection process 300, discussed further below in conjunction with FIG. 3, and an interface 1200, discussed further below in conjunction with FIG. 12. In at least one embodiment, the automatic output format selection process 300 crawls the storage system to identify existing formats, trends in the transcoding process and a popularity of downloaded files.

A ranked list 140 of desired output formats is obtained during step 240.

The transcoding algorithm(s) to be used to generate the desired output formats are selected during step 245, using a transcoding algorithm(s) selection process 500, discussed further below in conjunction with FIG. 5. It is noted that, depending on the list of desired media format outputs, more than one transcoding algorithm may be used. In at least one embodiment, the exemplary transcoding algorithm(s) selection process 500 employs a media file profiling technique that identifies contextual information about the input file 110, and correlates the contextual information to similar files stored in the file system (and the processes used to transcode them), to gather intelligence around choices made with respect to files, algorithms used in the transcoding process and their final outcomes.

Figure 8:
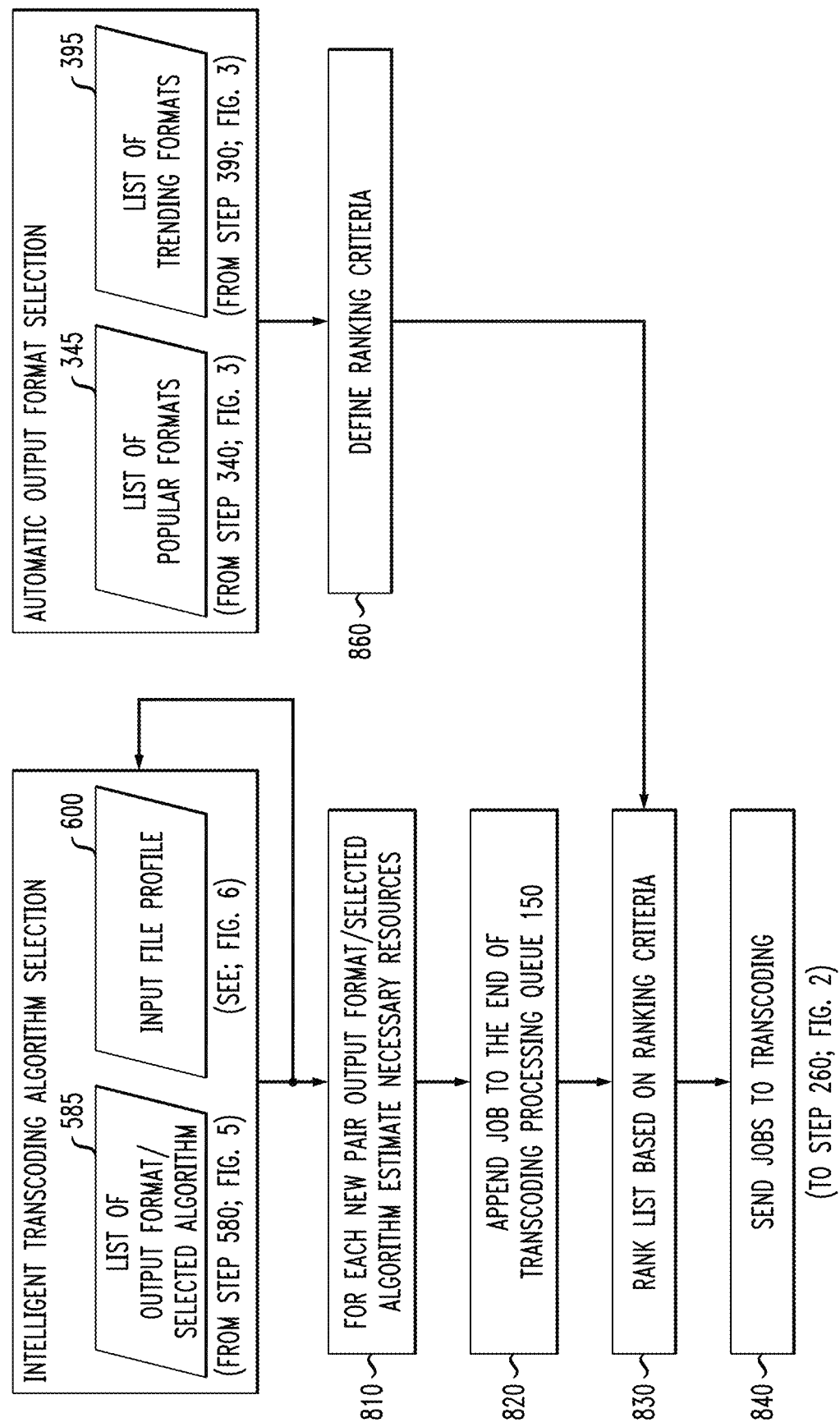
FIG. 8 is a flow chart illustrating an exemplary implementation of the resource allocation and queuing process, according to one embodiment of the invention.

A resource allocation and queuing process 800, discussed further below in conjunction with FIG. 8, is executed during step 250 to balance between the effort required to process the input file 110 and the overall load of the automatic media transcoding system 100 to determine the resources allotted to processing of a new media file. In at least one embodiment, the exemplary resource allocation and queuing process 800 considers attributes of the input file 110 in question (e.g., size and encoding) and contextual data (as per the particulars of its submission and additional information obtained from its metadata, including provenance data and information about the file 110 itself such as creation date) and estimates the necessary effort to process the input file into all the desired formats, as informed by the resource allocator.

The input file 110 is then transcoded during step 260 into the desired output formats in the list 140, using the transcoding algorithm(s) selected during step 245.

The transcoded file(s) are then annotated during step 270, using an annotation process 900, discussed further below in conjunction with FIG. 9. Generally, the annotation process 900 enriches the metadata associated with the transcoded file(s). The output files 280-1 through 280-N are annotated with the enriched metadata. The enriched metadata is optionally stored in a separate repository, shown in FIG. 2 as the media catalogue 170. Thus, the exemplary automatic media transcoding process 200 optionally separately stores the output files 280-1 through 280-N and the enriched metadata.

FIG. 3 is a flow chart illustrating an exemplary implementation of the automatic output format selection process 300, according to one embodiment of the invention. As noted above, the exemplary automatic media transcoding process 200 makes an automatic output format selection during step 230, using the automatic output format selection process 300, and an interface 1200, discussed further below in conjunction with FIG. 12. In at least one embodiment, the automatic output format selection process 300 crawls the storage system to identify existing formats, trends in the transcoding process and a popularity of downloaded files.

As shown in FIG. 3, the exemplary automatic output format selection process 300 receives previously stored (and transcoded) videos 305 as input. During steps 310 and 320, the exemplary automatic output format selection process 300 computes popular formats and a popular index ($Pop_F$). In one or more embodiments, the popular index ($Pop_F$) is computed, as follows:

$$Pop_F = \frac{\text{total number of video files}}{\text{total number of files of format } F}$$

where F is the video file format.

The popularity-based results are ranked during step 330, and a list of popular formats 345 is generated during step 340.

During steps 350 and 360, the exemplary automatic output format selection process 300 computes trending formats and a trending index ($Trend_F$). In one or more embodiments, the trending index ($Trend_F$) is computed, as follows:

$$Trend_F = \frac{\text{number of added/downloaded files over } P}{\text{number of files added/downloaded of format } F \text{ over } P}$$

where P is the period in time and F is the video file format.

The trending-based results are ranked during step 370. A cutout threshold (TS) is optionally determined during step 380. In one or more embodiments, the cutout threshold (TS) is defined, as follows:

If TS>$Trend_F$, format F is selected;
else, if TS≤$Trend_F$, format F is not selected.

The threshold can be manually defined, but should be initialized with a default value. A number between 0.05 and 0.10 can be employed, for example.

A list of trending formats 395 is generated during step 390.

The trending and popular format lists are combined during step 397. An exemplary technique for combining the trending and popular formats is discussed further below in conjunction with FIG. 4. A list of output formats 140 (1-N) is generated during step 398.

FIG. 4 illustrates exemplary pseudo code 400 for combining the trending and popular formats identified by the exemplary automatic output format selection process 300. As shown in FIG. 4, the exemplary pseudo code 400 defines weights for popular (Wp) and trending (Wt) formats; applies the weights as a percent cut to their respective lists; and combines the remaining items of both lists to form the combined list.

FIG. 5 is a flow chart illustrating an exemplary implementation of the transcoding algorithm(s) selection process 500, according to one embodiment of the invention. As noted above, the exemplary automatic media transcoding process 200 selects the transcoding algorithm(s) to be used to generate the desired output formats during step 245, using the transcoding algorithm(s) selection process 500. In at least one embodiment, the exemplary transcoding algorithm(s) selection process 500 employs a media file profiling technique that identifies contextual information about the input file 110, and correlates the contextual information to similar files stored in the file system (and the processes used to transcode them), to gather intelligence around choices made with respect to files, algorithms used in the transcoding process and their final outcomes.

As shown in FIG. 5, the exemplary transcoding algorithm(s) selection process 500 receives input file 110 and the list of output formats 140 as input. The transcoding algorithm(s) selection process 500 profiles the input file 110, as discussed further below in conjunction with FIG. 6, during step 510, and scans the repository of previously stored videos 305 for similar files during step 520 (for example, using machine learning techniques). A similarity metric can consider, for example, shared file features between files, such as file size, resolution, encoding and producer.

A test is performed during step 530 to determine if any similar files are identified. If it is determined during step 530 that similar files are not identified, then existing transcoding algorithms are used during step 540. If, however, it is determined during step 530 that similar files are identified, then unsupervised learning is used during step 550 to cluster the similar files, as discussed further below in conjunction with FIG. 7. The input file 110 is then placed in a cluster during step 560, and the best algorithm is selected during step 570, based on proximal similar files.

The exemplary transcoding algorithm(s) selection process 500 then produces a list 585 during step 580 of Output_Format/Selected_Algorithm Pairs for all N items in the output format list 396. Thereafter, program control proceeds to the exemplary resource allocation and queuing process 800 (FIG. 8) (590).

As noted above, the transcoding algorithm(s) selection process 500 profiles the input file 110 during step 510. FIG. 6 illustrates the collection 600 of the profile information for the input file 110. As shown in FIG. 6, in at least one embodiment, the following data is collected about the input file header and metadata (when available): time stamp; date of creation; format; codec; location; and content metadata. A content metadata example 650 is also presented in FIG. 6.

It is noted that in the example of FIG. 6, the use of provenance metadata is illustrated to capture information about previous history of the file (e.g., whether the file was transcoded from a different format, algorithms used, and the performance of the process). This information may not be available for pre-existing files, but it is provided by the automatic media transcoding process 200.

As noted above, when similar files are identified by the transcoding algorithm(s) selection process 500, unsupervised learning is used during step 550 to cluster the similar files. FIG. 7 illustrates exemplary pseudo code 700 for clustering similar files. As shown in FIG. 7, the exemplary pseudo code 700 defines a number of clusters n; chooses a centroid based clustering algorithm; computes the clusters; places the input file 110 in a cluster; and selects a transcoding algorithm by evaluating the ones used by (for example) three closest files to the input file in the cluster.

FIG. 8 is a flow chart illustrating an exemplary implementation of the resource allocation and queuing process 800, according to one embodiment of the invention. As noted above, the resource allocation and queuing process 800 is executed during step 250 of the automatic media transcoding process 200 to balance between the effort required to process the input file 110 and the overall load of the automatic media transcoding system 100 to determine the resources allotted to processing of a new media file. In at least one embodiment, the exemplary resource allocation and queuing process 800 considers attributes of the input file 110 in question (e.g., size and encoding) and contextual data (as per the particulars of its submission and additional information obtained from its metadata, including provenance data and information about the file 110 itself such as creation date) and estimates the necessary effort to process the input file into all the desired formats, as informed by the resource allocator.

As shown in FIG. 8, the exemplary resource allocation and queuing process 800 receives the list 585 of Output Format/Selected Algorithm pairs and the input file profile 600 as inputs. During step 810, for each new output format/selected algorithm pair, the exemplary resource allocation and queuing process 800 estimates the necessary resources. For example, the resources can be estimated using a linear utility function that considers the size of input file and the complexity of selected algorithm. The job is then appended to the end of transcoding processing queue 150 during step 820. Program control then proceeds to step 830, discussed below.

In addition, the exemplary resource allocation and queuing process 800 also receives the list of popular formats 345 and the list of trending formats 395 as inputs. The resource allocation and queuing process 800 then defines a ranking criteria during step 860. For example, the ranking criteria may include one or more of the following: prioritizing the top three trending formats over any file; alternating between most popular and most trending formats; and processing smaller files in the same format first, if (for example) the file size exceeds 45 Mbytes.

The list is then ranked during step 830, based on the ranking criteria defined in step 860. The jobs are then sent from the queue 150 to the transcoding performed in step 260 of FIG. 2 during step 840.

FIG. 9 is a flow chart illustrating an exemplary implementation of the annotation process 900, according to one embodiment of the invention. As noted above, the transcoded file(s) (1-N) generated by the transcoding step 260 (FIG. 2) are annotated during step 270. Generally, the annotation process 900 enriches the metadata associated with the transcoded file(s).

As shown in FIG. 9, the exemplary annotation process 900 receives the transcoded file(s) (1-N) generated by the transcoding step 260 as inputs. The following metadata tags are created during step 910 for each transcoded file: previous format (of input file 110); encoder (selected algorithm used for the transcoding process); encoding time (total duration of the transcoding process); parallel indicator; and core number (number of cores used in parallelization, if parallelized).

The metadata is then applied to the transcoded files, for example, by inserting new "key=value" line(s) to the text file during step 920, to create the output files 280-1 through 280-N. In addition, the metadata entry is optionally copied during step 940 to the separate media catalogue 170, as discussed above.

Figure 10:
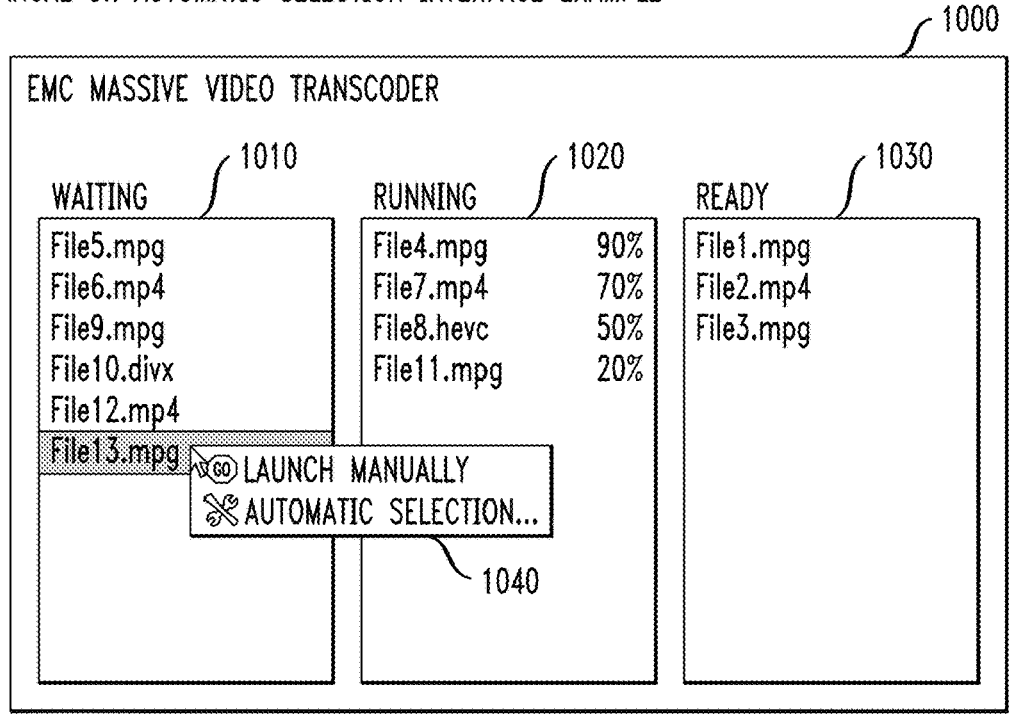
FIGS. 10 through 12 illustrate exemplary user interfaces, according to various embodiments of the invention.

FIG. 10 illustrates an exemplary user interface 1000 that allows the user to specify whether an automatic or manual selection of the desired output formats should be performed. As shown in FIG. 10, the exemplary user interface 1000 includes panels 1010, 1020 and 1030 for indicating files that are waiting to be processed, currently running and ready (complete), respectively.

In addition, for the files that are waiting to be processed, the user can click a file to open a dialog box 1040 allowing the user to specify whether an automatic or manual selection of the desired output formats should be performed for the selected file.

Figure 11:
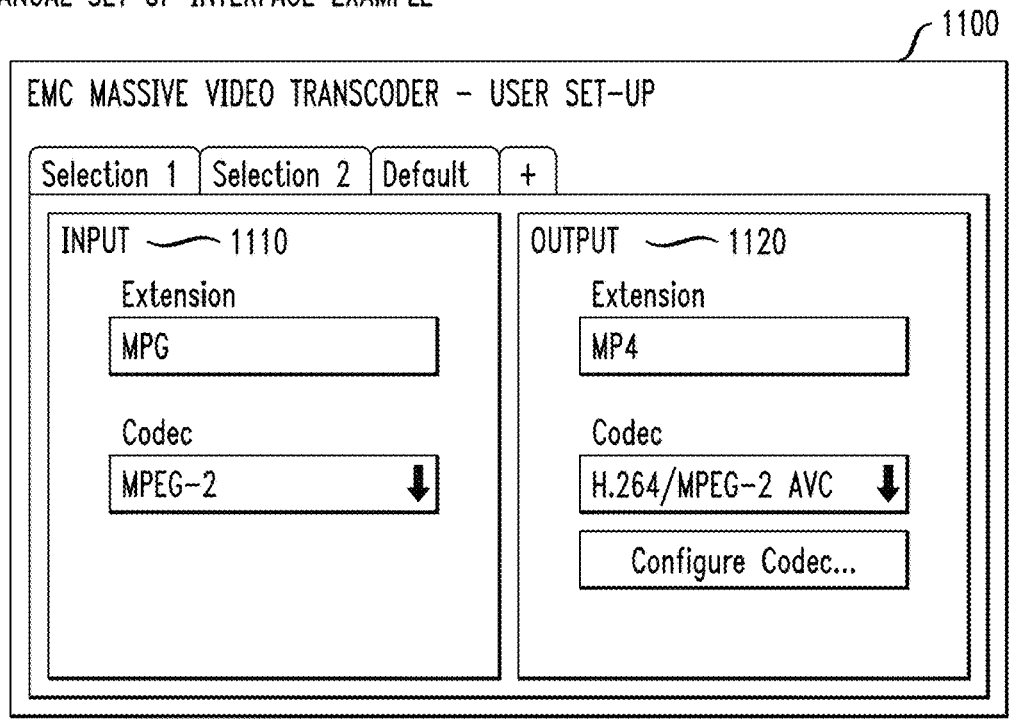

FIG. 11 illustrates an exemplary user interface 1100 that allows the user to make a manual selection of the desired output format(s). As shown in FIG. 11, the exemplary user interface 1100 includes panels 1110 and 1120 to allow the user to specify the extensions and codec for the input and output files, respectively.

Figure 12:
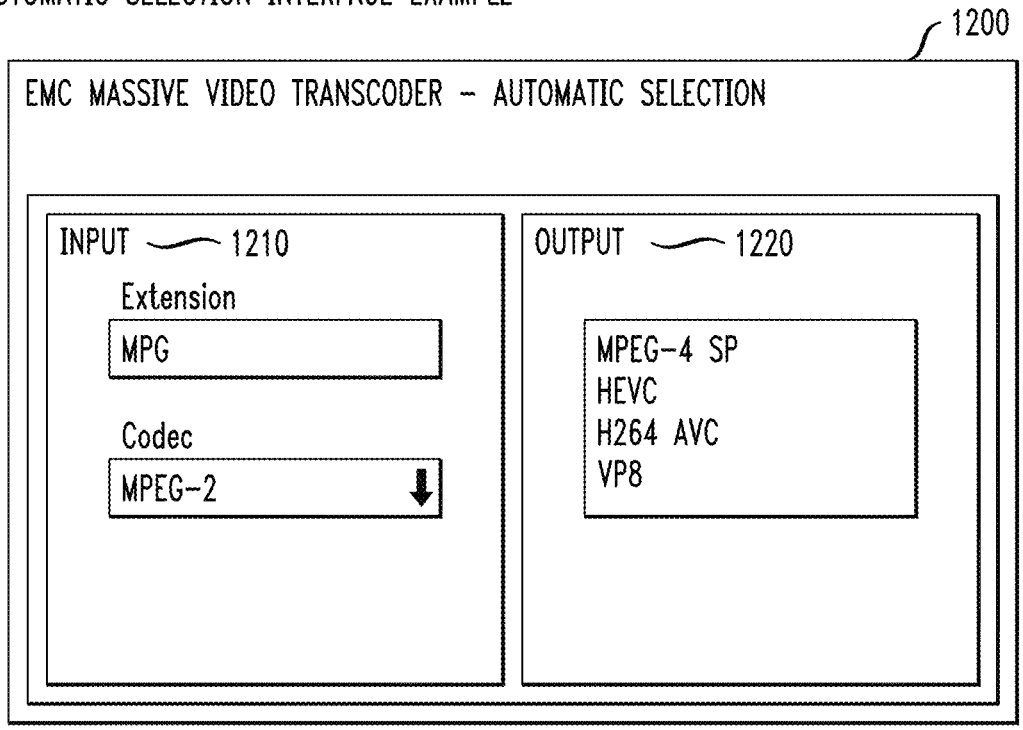

FIG. 12 illustrates an exemplary user interface 1200 that includes a panel 1210 that allows the user to specify the extensions and codec for the input file 110, and a panel 1220 that lists the automatically selected output format(s).

CONCLUSION

Among other benefits, one or more embodiments of the invention provide methods and apparatus for automatic transcoding of media files for consumption in mobile (phone, tablets, smart watches), as well as other electronic devices with access to the Internet, such as laptops and desktop computers. The disclosed techniques combine a series of mechanisms to support one or more of the following tasks: automatically or manually defining a list of relevant (e.g., popular and/or trending) output formats: profiling and identifying the most efficient transcoding algorithms for any given input file: managing and allocating compute resources: managing the job queue: annotating output content to facilitate search and recovery; and automatically creating a media catalogue to support search and facilitate managing the media inventory.

Moreover, other forms and advantages of the invention will in part be obvious and will in part be apparent from the specification and drawings. It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in an exemplary distributed computing environment. Such components can communicate with other elements of an exemplary metadata storage environment over any type of network or other communication media.

Aspects of the present invention are described herein with reference to flowchart illustrations and/or block diagrams of methods, apparatus (systems) and computer program products, according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 13:
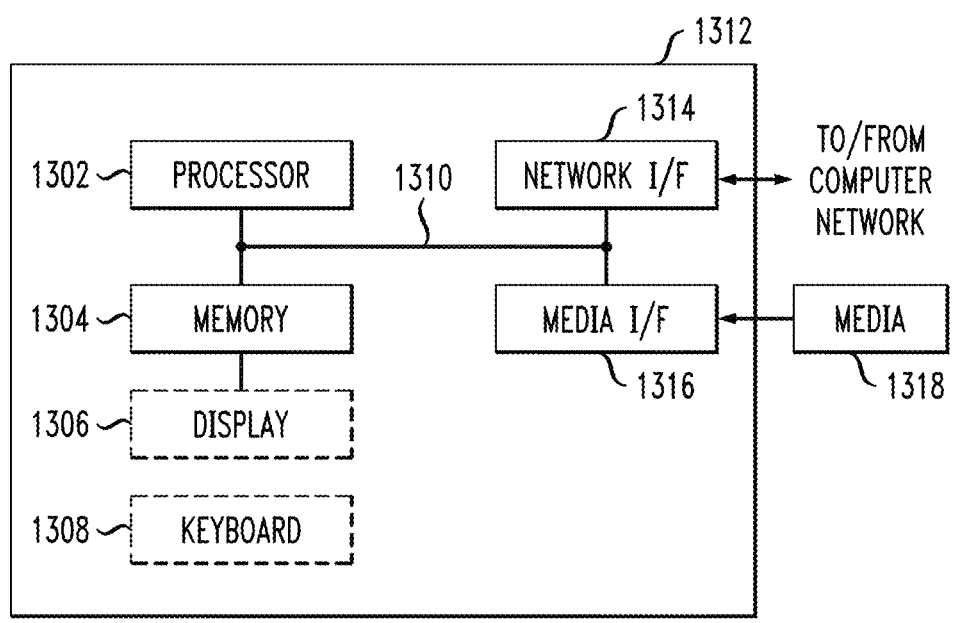
FIG. 13 is a system diagram of an exemplary computer system on which at least one embodiment of the invention can be implemented.

By way of example, an aspect of the present invention can make use of software running on a general purpose computer. FIG. 13 is a system diagram of an exemplary computer system on which at least one embodiment of the invention can be implemented. As depicted in FIG. 13, an example implementation employs, for example, a processor 1302, a memory 1304, and an input/output interface formed, for example, by a display 1306 and a keyboard 1308. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1302, memory 1304, and input/output interface such as display 1306 and keyboard 1308 can be interconnected, for example, via bus 1310 as part of a data processing unit 1312. Suitable interconnections via bus 1310, can also be provided to a network interface 1314 (such as a network card), which can be provided to interface with a computer network, and to a media interface 1316 (such as a diskette or compact disc read-only memory (CD-ROM) drive), which can be provided to interface with media 1318.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1302 coupled directly or indirectly to memory elements 1304 through a system bus 1310. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1308, displays 1306, and pointing devices, can be coupled to the system either directly (such as via bus 1310) or through intervening I/O controllers.

Network adapters such as network interface 1314 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1312 as depicted in FIG. 13) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
   obtaining at least one input media file having an input file format and encoded with a codec of a first type;
   automatically determining one or more output media file formats for transcoding said one or more input media files based on statistics of previously transcoded files and statistics of one or more trending media formats for previously downloaded files over a given period of time, wherein the statistics of the one or more trending media formats comprise a trending index for each of said output file formats, wherein the trending index for a given one of the output file formats is based at least in part on a total number of the previously downloaded files over the given period of time divided by the total number of the previous transcoded files of the given output file format over the given period of time;
   transcoding said one or more input media files into one or more transcoded output media files using a codec of a second type to obtain said determined one or more output media file formats, wherein at least one of said output media file formats is a different file format than said input file format; and
   generating metadata for each of said plurality of transcoded output media files, wherein said metadata is stored in memory as a media catalogue accessible via a content delivery network, and wherein said one or more transcoded output media files are stored and indexed separately from said metadata.

2. The method of claim 1, wherein said generating said metadata comprises enriching one or more existing metadata formats with one or more additional metadata fields.

3. The method of claim 1, wherein said metadata comprises historical information for a given one of the plurality of transcoded output media files, wherein said historical information for said given transcoded output media file comprises one or more of:
   a previous format;
   a type of encoder used for said transcoding;
   an encoding time;
   an indication of whether said transcoding applied parallelization; and
   a number of cores used in said parallelization.

4. The method of claim 1, wherein said separate media catalogue is accessible via a content delivery network and said plurality of transcoded output media files are accessible via a network file system.

5. The method of claim 1, wherein the statistics of previously transcoded files comprise a popularity measure of each media format used to transcode said previously transcoded files.

6. The method of claim 5, wherein the step of automatically determining one or more output media file formats for transcoding said one or more input media files further comprises the steps of (i) assigning a weight to a set of popular media file formats selected based on said popularity measure and a weight to a set of said trending media file formats; and (ii) combining said weighted media file formats into a single list.

7. The method of claim 1, further comprising the step of automatically selecting one or more transcoding algorithms for said transcoding of said one or more input media files into said determined one or more output media file formats using an unsupervised technique for grouping similar objects that identifies an algorithm used to transcode one or more proximally similar files as said one or more input media files from said previously transcoded files.

8. The method of claim 1, further comprising the step of dynamically prioritizing a plurality of said input files to transcode based on a complexity rating of said determined one or more output media file formats and a ranking of said selected transcoding algorithms.

9. The method of claim 1, further comprising the step of processing a query of said generated metadata stored in said separate media catalogue.

10. A computer program product, comprising a tangible machine-readable storage medium having encoded therein executable code of one or more software programs, wherein the one or more software programs when executed by at least one processing device perform the following steps:
    obtaining at least one input media file having an input file format and encoded with a codec of a first type;
    automatically determining one or more output media file formats for transcoding said one or more input media files based on statistics of previously transcoded files and statistics of one or more trending media formats for previously downloaded files over a given period of time, wherein the statistics of the one or more trending media formats comprise a trending index for each of said output file formats, wherein the trending index for a given one of the output file formats is based at least in part on a total number of the previously downloaded files over the given period of time divided by the total number of the previous transcoded files of the given output file format over the given period of time;

transcoding said one or more input media files into one or more transcoded output media files using a codec of a second type to obtain said determined one or more output media file formats, wherein at least one of said output media file formats is a different file format than said input file format; and generating metadata for each of said plurality of transcoded output media files, wherein said metadata is stored in memory as a media catalogue accessible via a content delivery network, and wherein said one or more transcoded output media files are stored and indexed separately from said metadata.

11. The computer program product of claim 10, said generating said metadata comprises enriching one or more existing metadata formats with one or more additional metadata fields.

12. The computer program product of claim 10, wherein the step of automatically determining one or more output media file formats for transcoding said one or more input media files further comprises the steps of (i) assigning a weight to a set of popular media file formats selected based on said popularity measure and a weight to a set of said trending media file formats; and (ii) combining said weighted media file formats into a single list.

13. The computer program product of claim 10, wherein said metadata comprises historical information for a given one of the plurality of transcoded output media files, wherein said historical information for said given transcoded output media file comprises one or more of:
 a previous format;
 a type of encoder used for said transcoding;
 an encoding time;
 an indication of whether said transcoding applied parallelization; and
 a number of cores used in said parallelization.

14. The computer program product of claim 10, wherein said separate media catalogue is accessible via a content delivery network and said plurality of transcoded output media files are accessible via a network file system.

15. A system, comprising:
 a memory; and
 at least one processing device, coupled to the memory, operative to implement the following steps:
 obtaining at least one input media file having an input file format and encoded with a codec of a first type;
 automatically determining one or more output media file formats for transcoding said one or more input media files based on statistics of previously transcoded files and statistics of one or more trending media formats for previously downloaded files over a given period of time;
 transcoding said one or more input media files into one or more transcoded output media files using a codec of a second type to obtain said determined one or more output media file formats, wherein at least one of said output media file formats is a different file format than said input file format, wherein the statistics of the one or more trending media formats comprise a trending index for each of said output file formats, wherein the trending index for a given one of the output file formats is based at least in part on a total number of the previously downloaded files over the given period of time divided by the total number of the previous transcoded files of the given output file format over the given period of time; and
 generating metadata for each of said plurality of transcoded output media files, wherein said metadata is stored in memory as a media catalogue accessible via a content delivery network, and wherein said one or more transcoded output media files are stored and indexed separately from said metadata.

16. The system of claim 15, wherein said generating said metadata comprises enriching one or more existing metadata formats with one or more additional metadata fields.

17. The system of claim 15, wherein said metadata comprises historical information for a given one of the plurality of transcoded output media files, wherein said historical information for said given transcoded output media file comprises one or more of:
 a previous format;
 a type of encoder used for said transcoding;
 an encoding time;
 an indication of whether said transcoding applied parallelization; and
 a number of cores used in said parallelization.

18. The system of claim 15, wherein said separate media catalogue is accessible via a content delivery network and said plurality of transcoded output media files are accessible via a network file system.

19. The method of claim 1, wherein the step of automatically determining one or more output media file formats for transcoding said one or more input media files further comprises:
 computing a popularity index for each of said output file formats, wherein the popularity index for a given one of the output file formats is based at least in part on to a total number of the previously transcoded files divided by a total number of the previous transcoded files of the given output file format.

20. The method of claim 19, wherein the step of automatically determining one or more output media file formats for transcoding said one or more input media files is based at least in part on a comparison of the one or more output file media file formats to a cutout threshold.

* * * * *

UNITED STATES PATENT AND TRADEMARK OFFICE
CERTIFICATE OF CORRECTION

| | |
|---|---|
| PATENT NO. | : 11,388,367 B2 |
| APPLICATION NO. | : 16/912892 |
| DATED | : July 12, 2022 |
| INVENTOR(S) | : Karin Breitman |

It is certified that error appears in the above-identified patent and that said Letters Patent is hereby corrected as shown below:

In the Claims

Column 13, Lines 65-66, of Claim 1 reading "for each of said plurality of transcoded output media files" should read -- for each of said one or more transcoded output media files --

Column 14, Lines 8-9, of Claim 3 reading "for a given one of the plurality of transcoded output media files" should read -- for a given one of the one or more transcoded output media files --

Column 14, Lines 18-20, of Claim 4 reading "wherein said separate media catalogue is accessible via a content delivery network and said plurality of transcoded output media files" should read -- wherein said one or more transcoded output media files --

Column 15, Lines 9-10, of Claim 10 reading "for each of said plurality of transcoded output media files" should read -- for each of said one or more transcoded output media files --

Column 15, Lines 29-30, of Claim 13 reading "for a given one of the plurality of transcoded output media files" should read -- for a given one of the one or more transcoded output media files --

Column 15, Lines 39-42, of Claim 14 reading "wherein said separate media catalogue is accessible via a content delivery network and said plurality of transcoded output media files" should read -- wherein said one or more transcoded output media files --

Column 16, Lines 14-15, of Claim 15 reading "for each of said plurality of transcoded output media files" should read -- for each of said one or more transcoded output media files --

Column 16, Lines 24-25, of Claim 17 reading "for a given one of the plurality of transcoded output media files" should read -- for a given one of the one or more transcoded output media files --

Signed and Sealed this
Thirtieth Day of August, 2022

Katherine Kelly Vidal
*Director of the United States Patent and Trademark Office*

Column 16, Lines 34-36, of Claim 18 reading "wherein said separate media catalogue is accessible via a content delivery network and said plurality of transcoded output media files" should read
-- wherein said one or more transcoded output media files --